United States Patent
Ichinose et al.

(10) Patent No.: US 12,100,155 B2
(45) Date of Patent: Sep. 24, 2024

(54) REGION SPECIFICATION APPARATUS, REGION SPECIFICATION METHOD, REGION SPECIFICATION PROGRAM, LEARNING APPARATUS, LEARNING METHOD, LEARNING PROGRAM, AND DISCRIMINATOR

(71) Applicant: FUJIFILM Corporation, Tokyo (JP)

(72) Inventors: Akimichi Ichinose, Tokyo (JP); Yoshiro Kitamura, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 408 days.

(21) Appl. No.: 17/407,179

(22) Filed: Aug. 19, 2021

(65) Prior Publication Data
US 2021/0383164 A1    Dec. 9, 2021

Related U.S. Application Data

(63) Continuation of application No. PCT/JP2019/044390, filed on Nov. 12, 2019.

(30) Foreign Application Priority Data

Feb. 28, 2019    (JP) .................. 2019-036241

(51) Int. Cl.
*G06K 9/62*    (2022.01)
*G06F 18/2132*    (2023.01)
(Continued)

(52) U.S. Cl.
CPC ........ *G06T 7/0016* (2013.01); *G06F 18/2132* (2023.01); *G06N 3/08* (2013.01); *G06V 10/25* (2022.01); *G06V 10/82* (2022.01)

(58) Field of Classification Search
CPC ...... G06T 7/0016; G06V 10/25; G06V 10/82; G06F 18/2132; G06N 3/08
See application file for complete search history.

(56) References Cited

U.S. PATENT DOCUMENTS 9,858,496 B2    1/2018 Sun et al.
9,940,709 B2 *  4/2018 Gillies ................... A61B 6/037
(Continued)

FOREIGN PATENT DOCUMENTS

JP    2017191501    10/2017

OTHER PUBLICATIONS

Shaoqing Ren et al., "Faster R-CNN: Towards Real-Time Object Detection with Region Proposal Networks," IEEE Transactions on Pattern Analysis and Machine Intelligence, vol. 39, Jun. 2017, pp. 1137-1149.
Fukui Hiroshi et al., "Research Trends in Pedestrian Detection Using Deep Learning," with partial English translation, IEICE Technical Report, vol. 116, Dec. 2016, pp. 37-46.
"International Search Report (Form PCT/ISA/210) of PCT/JP2019/044390," mailed on Dec. 24, 2019, with English translation thereof, pp. 1-5.
(Continued)

*Primary Examiner* — Gregory M Desire
(74) *Attorney, Agent, or Firm* — JCIPRNET

(57) ABSTRACT

A region specification apparatus specifies a region of an object which is included in an input image and which includes a plurality of subclass objects having different properties. The region specification apparatus includes a first discriminator that specifies an object candidate included in the input image. The first discriminator has a component configured to predict at least one of movement or transformation of a plurality of anchors according to the property of the subclass object and specify an object candidate region surrounding the object candidate.

14 Claims, 11 Drawing Sheets

(51) Int. Cl.
   *G06K 9/46* (2006.01)
   *G06N 3/08* (2023.01)
   *G06T 7/00* (2017.01)
   *G06V 10/25* (2022.01)
   *G06V 10/82* (2022.01)

(56) References Cited

U.S. PATENT DOCUMENTS

| | | | |
|---|---|---|---|
| 10,489,684 B2* | 11/2019 | Choi | G06V 10/255 |
| 10,558,891 B2* | 2/2020 | Wang | G06F 18/214 |
| 10,699,162 B2* | 6/2020 | Chung | G06V 20/10 |
| 10,867,384 B2* | 12/2020 | Song | G06T 7/0012 |
| 10,867,417 B2* | 12/2020 | Han | A61B 5/055 |
| 11,188,766 B2* | 11/2021 | Rahimpour | G06T 7/73 |
| 11,250,591 B2* | 2/2022 | Yang | G06T 7/75 |
| 2019/0050994 A1 | 2/2019 | Fukagai | |
| 2019/0205688 A1 | 7/2019 | Yano et al. | |

OTHER PUBLICATIONS

"Written Opinion of the International Searching Authority (Form PCT/ISA/237)" of PCT/JP2019/044390, mailed on Dec. 24, 2019, with English translation thereof, pp. 1-7.

"Search Report of Europe Counterpart Application", issued on Mar. 28, 2022, pp. 1-9.

Xiaojie Li et al., "Detector-in-Detector: Multi-Level Analysis for Human-Parts", arXiv:1902.07017v1 [cs.CV], Feb. 2019, pp. 1-13.

Kaiming He et al., "Mask R-CNN", 2017 IEEE International Conference on Computer Vision (ICCV), Oct. 2017, pp. 2980-2988.

Umer Farooq, "From R-CNN to Mask R-CNN", Feb. 15, 2018, Available at: https://medium.com/@umerfarooq_26378/from-r-cnn-to-mask-r-cnn-d6367b196cfd.

"Search Report of Europe Counterpart Application", issued on Feb. 26, 2024, pp. 1-7.

* cited by examiner

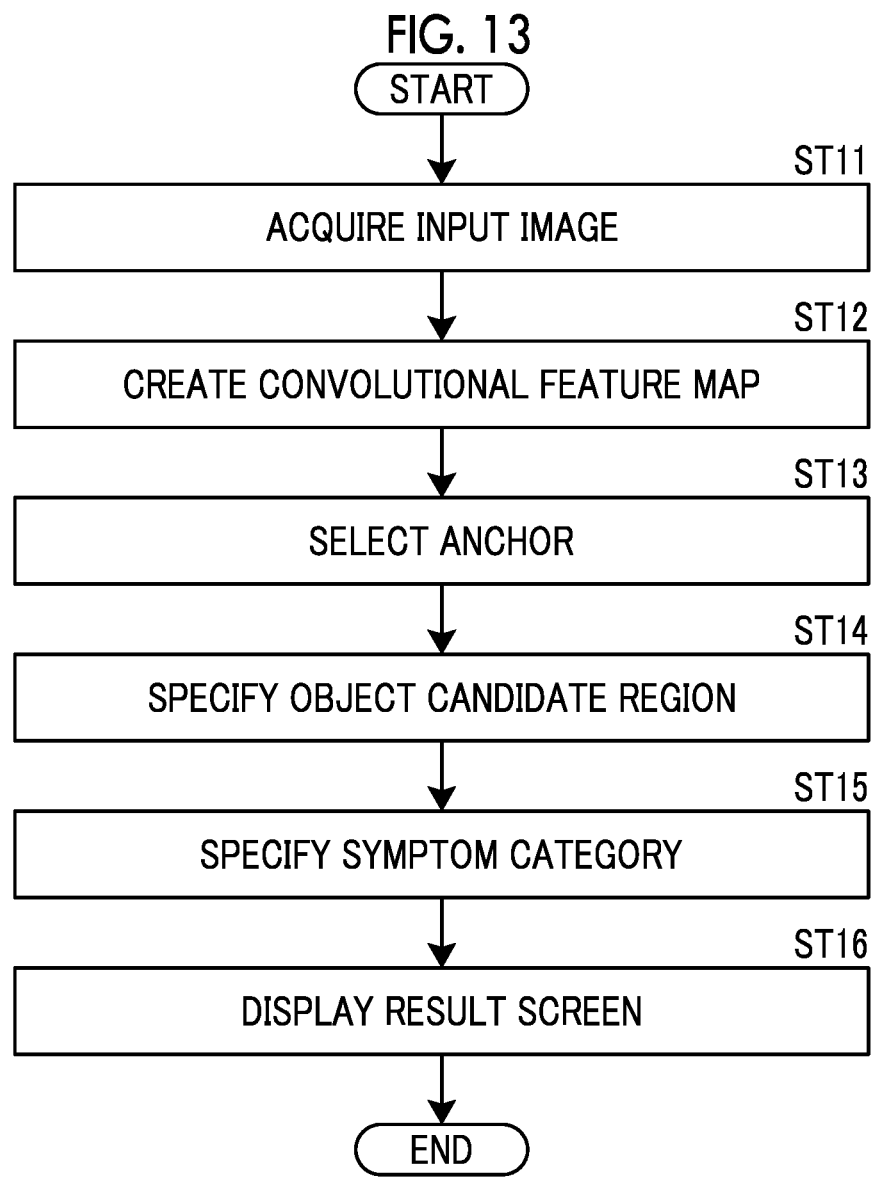

REGION SPECIFICATION APPARATUS, REGION SPECIFICATION METHOD, REGION SPECIFICATION PROGRAM, LEARNING APPARATUS, LEARNING METHOD, LEARNING PROGRAM, AND DISCRIMINATOR

CROSS REFERENCE TO RELATED APPLICATIONS

The present application is a Continuation of PCT International Application No. PCT/JP2019/044390 filed on Nov. 12, 2019, which claims priority under 35 U.S.C. § 119(a) to Japanese Patent Application No. 2019-036241 filed on Feb. 28, 2019. Each of the above applications is hereby expressly incorporated by reference, in its entirety, into the present application.

BACKGROUND

Technical Field

The present disclosure relates to a region specification apparatus that specifies a region of an object included in an image, a region specification method, a region specification program, a learning apparatus, a learning method, a learning program, and a discriminator.

Related Art

In recent years, advances in medical equipment such as a computed tomography (CT) apparatus and a magnetic resonance imaging (MRI) apparatus have made it possible to perform diagnostic imaging using a higher quality three-dimensional image having higher resolution. A region such as an organ and a lesion included in such a three-dimensional image has also been automatically extracted. As such a method for extracting a region from an image, a method of using a discriminator of which learning is performed by machine learning such as deep learning has been proposed. In particular, Faster-RCNN (Regions with CNN features) has been known as a convolutional neural network (convolution neural network; CNN) used in deep learning (see "Ren, Shaoqing, et al., "Faster R-CNN: Towards real-time object detection with region proposal networks", Advances in neural information processing systems, 2015" and U.S. Pat. No. 9,858,496B).

The Faster-RCNN is composed of convolutional layers that extract feature values from an input image to generate a feature map, region proposal networks (RPN) that specify an object candidate region, and a classification network that receives the feature map and the object candidate region as an input to output the results of category classification and regression of the object. In the RPN of the Faster-RCNN, rectangular regions called anchors having a plurality of aspect ratios and sizes are defined in advance. In the RPN, a plurality of types of anchors are applied to each pixel position of the feature map generated from the input image, and an anchor having the highest overlap ratio with an object candidate included in the input image is selected. Then, in the RPN, processing of regressing (that is, transforming or moving) the anchor is performed by using the selected anchor on all the pixels of the feature map so that the anchor matches with a rectangle (ground truth box) surrounding the object candidate, and then the position and size of the anchor regressed to match with the ground truth box are output from the RPN as an object candidate region in the input image. After that, in the classification network, the object candidate region in the input image is classified on the basis of the object candidate region and the feature map.

Further, in order to efficiently specify a person included in the image by using CNN, a method of using a vertically long anchor having an aspect ratio of 1:2 which is close to an aspect ratio in a state in which the person is standing, from among the plurality of types of anchors has been proposed (see JP2017-191501A).

Meanwhile, it is conceivable to use the Faster-RCNN in order to specify lung cancer included in the input image of the chest. In this case, the Faster-RCNN is built so that a candidate region of the lung cancer in the input image is specified in the RPN, and the candidate region of the lung cancer is classified into the category of a malignant lesion or a benign lesion, or the category of a non-lesion region in the classification network. Here, examples of the candidate region of the lung cancer include a lung nodule region. In addition, the lung nodules include lung nodules having different properties, such as ground-glass lung nodules and solid lung nodules. For this reason, the learning of the RPN is performed such that the RPN specifies the lung nodule regions of all properties.

It is also conceivable to use the Faster-RCNN in order to specify the face of a person included in the input image. In this case, the Faster-RCNN is built so that a face candidate region of the person in the input image is specified in the RPN, and the face candidate region is classified into the face candidate region and non-face region in the classification network. Here, the properties of a person, such as the skin color and the hair color of the person, differ depending on race. For this reason, the learning of the RPN is performed such that the RPN specifies the face candidate region of the people of all race.

Even in a case where an object to be specified included in an image includes a plurality of objects having different properties (hereinafter, referred to as a subclass object), such as the lung cancer and the face of the person as described above, the object can be detected from the image by appropriately performing learning of the Faster-RCNN. However, in a case where the object to be specified includes the plurality of subclass objects having different properties, it is necessary to perform learning such that the anchor defined as RPN can specify the subclass objects of all properties. In a case where learning is performed in this manner, the configuration of the RPN becomes complicated, so that the learning burden becomes heavy. Further, the processing burden is also heavy in a case of specifying the object. Accordingly, the learning cannot be efficiently performed and the object cannot be efficiently specified.

SUMMARY OF THE INVENTION

The present invention has been made in view of the above circumstances, and an object thereof is to make it possible to more efficiently specify an object to be specified in a case where the object includes a plurality of subclass objects having different properties.

A region specification apparatus according to the present disclosure that specifies a region of an object which is included in an input image and which includes a plurality of subclass objects having different properties, the apparatus comprises:

a first discriminator that specifies an object candidate included in the input image, in which the first discriminator has a component configured to predict at least one of movement or transformation of a plurality of anchors according to the property of the subclass object and specify an object candidate region surrounding the object candidate.

The "property" represents at least one of the characteristics or the state that defines the appearance of the subclass object included in the input image. The characteristics and the state are defined by at least one of the shape of the subclass object, the signal value, the structure included in the subclass object, or the like. Therefore, in a case where at least one of the shape, the signal value, the structure included, or the like is different, it is defined to have different properties.

In the region specification apparatus according to the present disclosure, the first discriminator may select an anchor on the basis of a similarity in shape and size to a ground truth box including the object candidate, from among a plurality of anchors having various shapes and various sizes according to the property of the subclass object, predict at least one of movement or transformation of the selected anchor, and specify the object candidate region surrounding the object candidate.

In the region specification apparatus according to the present disclosure, the first discriminator may select the anchor on the basis of the similarity in shape and size to the ground truth box including the object candidate.

The region specification apparatus according to the present disclosure may further comprise a display controller that displays a subclass of the specified object candidate region on a display unit.

In the region specification apparatus according to the present disclosure, the display controller may display the input image in which the object candidate region is specified, on the display unit.

The region specification apparatus according to the present disclosure may further comprise a convolution unit that generates a convolutional feature map from the input image,
   in which the first discriminator may specify the object candidate region on the basis of the convolutional feature map.

The region specification apparatus according to the present disclosure may further comprise a second discriminator that specifies a category of the object candidate included in the object candidate region.

Alternatively, the region specification apparatus according to the present disclosure may further comprise a second discriminator that specifies a category of the object candidate on the basis of the convolutional feature map and the object candidate region.

In this case, the second discriminator may correct the object candidate region.

Further, the second discriminator may discriminate a contour of the object candidate in the object candidate region.

A learning apparatus according to the present disclosure that performs learning of a discriminator specifying an object candidate that is a candidate of an object which is included in an input image and which includes a plurality of subclass objects having different properties, the apparatus comprises:
   a learning unit that performs processing of applying, to a training image including a subclass object having a known property, an anchor according to the property, predicting at least one of movement or transformation of the applied anchor, and specifying an object candidate region surrounding, as the object candidate, the subclass object, by using a plurality of the training images to perform learning of the discriminator such that the discriminator predicts at least one of movement or transformation of a plurality of anchors according to the property of the subclass object and specifies the object candidate region surrounding the object candidate in the input image.

A discriminator according to the present disclosure is a discriminator that specifies an object candidate that is a candidate of an object which is included in an input image and which includes a plurality of subclass objects having different properties,
   in which the discriminator is configured so that processing of applying, to a training image including a subclass object having a known property, an anchor according to the property, predicting at least one of movement or transformation of the applied anchor, and specifying an object candidate region surrounding, as the object candidate, the subclass object, is performed by using a plurality of the training images to perform learning of the discriminator such that the discriminator predicts at least one of movement or transformation of a plurality of anchors according to the property of the subclass object and specifies the object candidate region surrounding the object candidate in the input image.

A region specification method according to the present disclosure of specifying a region of an object which is included in an input image and which includes a plurality of subclass objects having different properties, the method comprises:
   specifying an object candidate included in the input image by a first discriminator that has a component configured to predict at least one of movement or transformation of a plurality of anchors according to the property of the subclass object and specify an object candidate region surrounding the object candidate.

A learning method according to the present disclosure of performing learning of a discriminator specifying an object candidate that is a candidate of an object which is included in an input image and which includes a plurality of subclass objects having different properties, the method comprises:
   performing processing of applying, to a training image including a subclass object having a known property, an anchor according to the property, predicting at least one of movement or transformation of the applied anchor, and specifying an object candidate region surrounding, as the object candidate, the subclass object, by using a plurality of the training images to perform learning of the discriminator such that the discriminator predicts at least one of movement or transformation of a plurality of anchors according to the property of the subclass object and specifies the object candidate region surrounding the object candidate in the input image.

Further, the region specification method and the learning method according to the present disclosure may be provided as a program for causing a computer to execute the methods.

Another region specification apparatus according to the present disclosure comprises a memory that stores a command for causing a computer to execute processing of specifying a region of an object which is included in an input image and which includes a plurality of subclass objects having different properties; and
   a processor configured to execute the stored command, in which the processor executes processing of
      specifying an object candidate included in the input image by functioning as a first discriminator that has a component configured to predict at least one of movement or transformation of a plurality of anchors according to the property of the subclass object and specify an object candidate region surrounding the object candidate.

Another learning apparatus according to the present disclosure comprises a memory that stores a command for causing a computer to execute processing of performing learning of a discriminator specifying an object candidate that is a candidate of an object which is included in an input image and which includes a plurality of subclass objects having different properties; and a processor configured to execute the stored command, in which the processor executes processing of performing processing of applying, to a training image including a subclass object having a known property, an anchor according to the property, predicting at least one of movement or transformation of the applied anchor, and specifying an object candidate region surrounding, as the object candidate, the subclass object, by using a plurality of the training images to perform learning of the discriminator such that the discriminator predicts at least one of movement or transformation of a plurality of anchors according to the property of the subclass object and specifies the object candidate region surrounding the object candidate in the input image.

According to the present disclosure, the learning of the discriminator can be performed efficiently. In addition, the object candidate region can be efficiently specified in the input image.

BRIEF DESCRIPTION OF THE DRAWINGS

FIG. 13 is a flowchart showing region specification processing according to the present embodiment.

DETAILED DESCRIPTION

Figure 1:
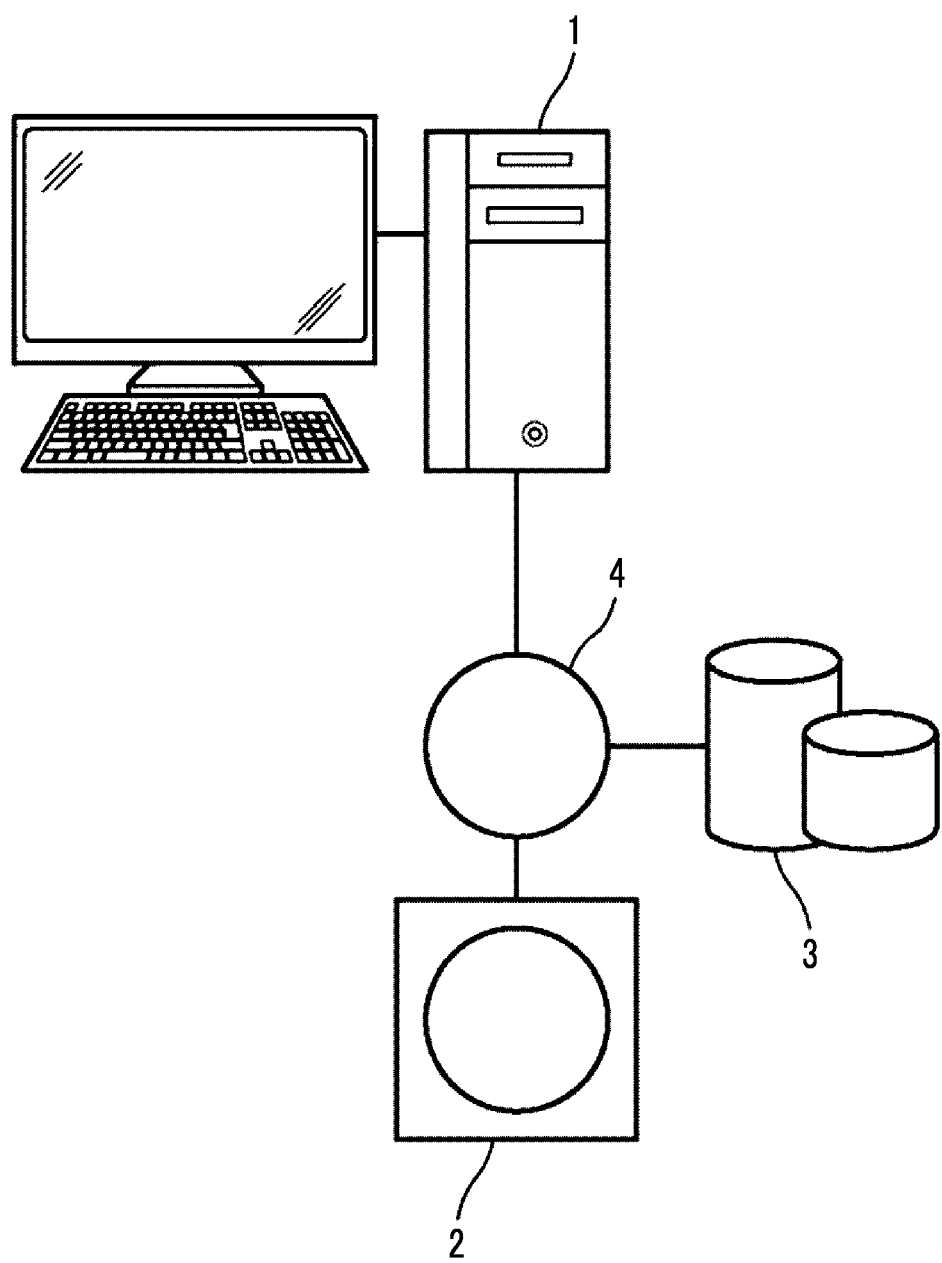
FIG. 1 is a hardware configuration diagram showing an outline of a diagnosis support system to which a region specification apparatus according to an embodiment of the present disclosure is applied.

Hereinafter, an embodiment of the present disclosure will be described with reference to the drawings. FIG. 1 is a hardware configuration diagram showing an outline of a diagnosis support system to which a region specification apparatus according to the embodiment of the present disclosure is applied. As shown in FIG. 1, in the diagnosis support system, a region specification apparatus 1, a three-dimensional image capturing apparatus 2, and an image storage server 3 according to the present embodiment are connected to communicate with one another via a network 4.

The three-dimensional image capturing apparatus 2 is an apparatus that generates a three-dimensional image representing a site of a subject as a diagnosis target by capturing the site, and specific examples thereof include a CT apparatus, an MRI apparatus, and a positron emission tomography (PET) apparatus. The three-dimensional image generated by the three-dimensional image capturing apparatus 2 is transmitted to and stored in the image storage server 3. In the present embodiment, the three-dimensional image capturing apparatus 2 is, for example, a CT apparatus, and a CT image including a site of a subject as a diagnosis target is generated as a three-dimensional image. In addition, the three-dimensional image consists of a plurality of tomographic images.

The image storage server 3 is a computer that stores and manages various data, and comprises a large-capacity external storage device and database management software. The image storage server 3 communicates with the other apparatus via a wired or wireless network 4 to transmit and receive image data and the like. Specifically, the image storage server 3 acquires various data including the image data of the three-dimensional image generated by the three-dimensional image capturing apparatus 2 via the network, and stores and manages the acquired data in a recording medium such as a large-capacity external storage device. A storage format of the image data and the communication between the apparatuses via the network 4 are based on a protocol such as digital imaging and communication in medicine (DICOM).

The region specification apparatus 1 includes a learning apparatus according to the embodiment, and is implemented by installing a region specification program and a learning program according to the embodiment on one computer. The computer may be a workstation or a personal computer directly operated by a doctor who makes diagnosis, or may be a server computer connected to the workstation or the personal computer via a network. The region specification program is distributed by being recorded in a recording medium such as a digital versatile disc (DVD) or a compact disc read only memory (CD-ROM), and is installed on a computer from the recording medium. Alternatively, the region specification program is stored in a storage device of a server computer or a network storage connected to the network to be accessible from the outside, and is downloaded and installed on the computer which is used by the doctor according to a request.

Figure 2:
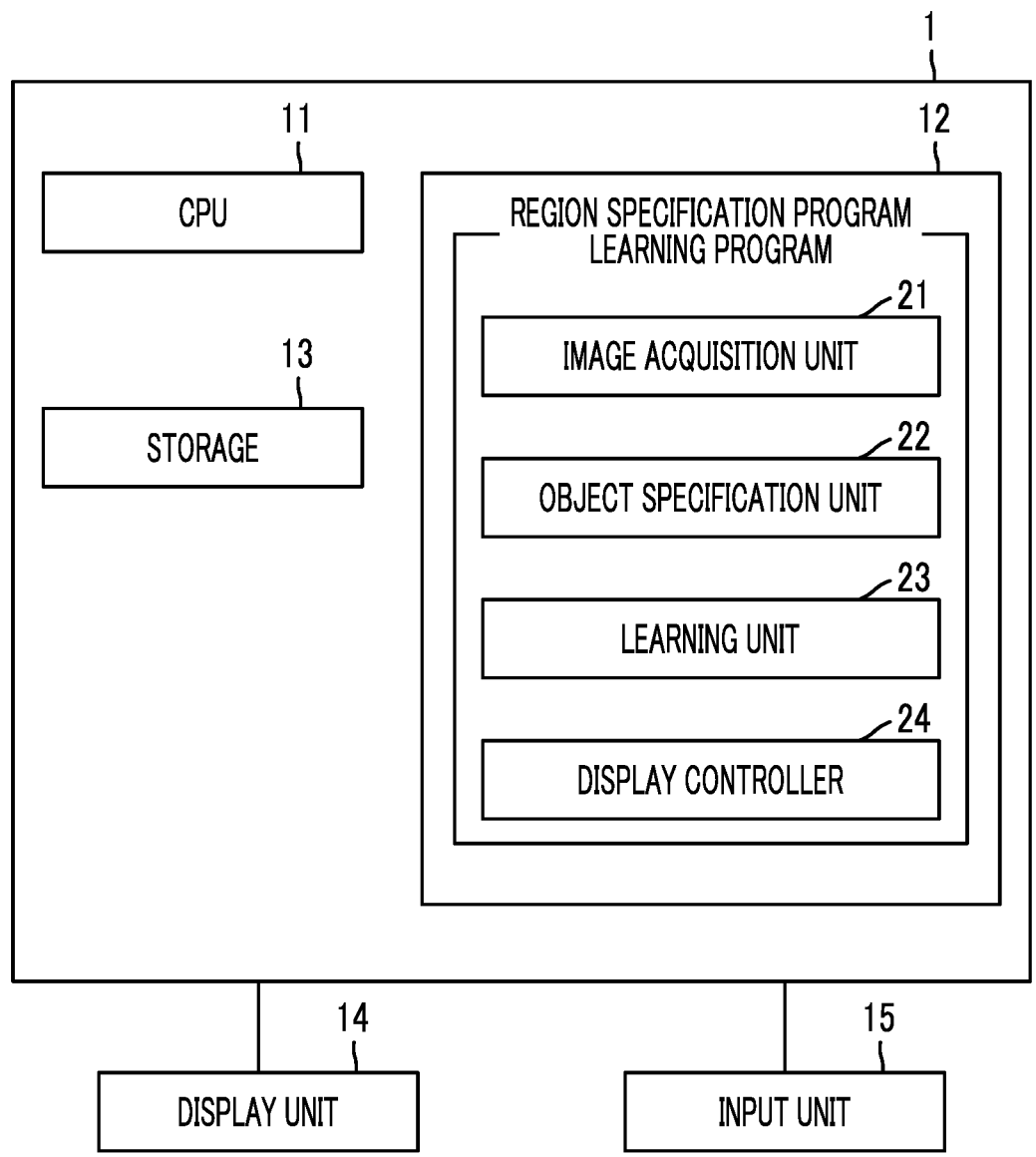
FIG. 2 is a diagram showing a schematic configuration of the region specification apparatus according to the embodiment of the present disclosure.

FIG. 2 is a diagram showing the schematic configuration of the region specification apparatus which is realized by installing the region specification program and the learning program on a computer. As shown in FIG. 2, the region specification apparatus 1 comprises a central processing unit (CPU) 11, a memory 12, and a storage 13 as a standard workstation configuration. Further, a display unit 14 such as a liquid crystal display, and an input unit 15 such as a keyboard and a mouse are connected to the region specification apparatus 1.

The storage 13 is provided with a hard disk drive or the like, and stores the input image acquired from the image storage server 3 via the network 4 and various information including information necessary for processing.

Further, the region specification program and the learning program are stored in the memory 12. As processing to be executed by the CPU 11, the region specification program defines image acquisition processing of acquiring an input image S0 as a target specifying an object region, object specification processing of specifying an object included in the input image S0, and display control processing of displaying the input image S0 in which an object candidate region, which will be described later, is specified. In addition, the learning program defines processing of performing learning of a first discriminator, which will be described later. The input image may be a three-dimensional image or a two-dimensional image. For the sake of explanation, in the present embodiment, for example, a tomographic image representing one tomographic plane of a three-dimensional image acquired by a CT apparatus is used as an input image, but the present disclosure is not limited thereto.

The CPU 11 executes the processing in accordance with the program, so that the computer functions as an image acquisition unit 21, an object specification unit 22, a learning unit 23, and a display controller 24.

The image acquisition unit 21 is provided with an interface or the like that acquires the input image S0 from the image storage server 3. In a case where the input image S0 is already stored in the storage 13, the image acquisition unit 21 may acquire the input image S0 from the storage 13.

Figure 3:
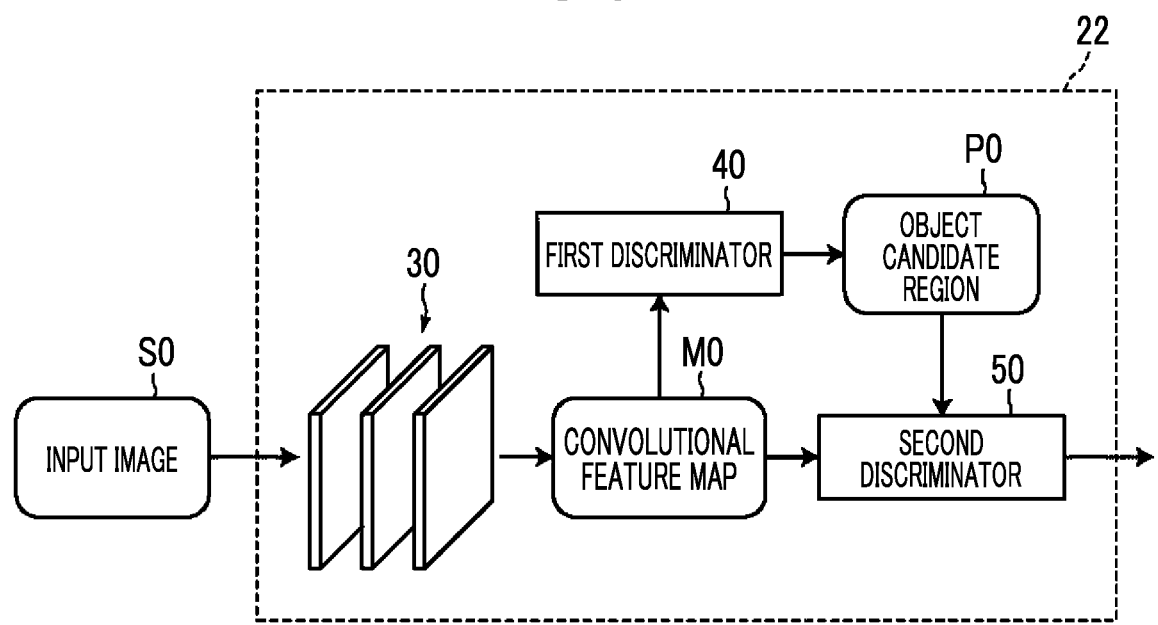
FIG. 3 is a schematic block diagram showing a configuration of an object specification unit.

The object specification unit 22 specifies an object included in the input image S0. In the present embodiment, the object specification unit 22 consists of Faster-RCNN. FIG. 3 is a schematic block diagram showing the configuration of the object specification unit 22. As shown in FIG. 3, the object specification unit 22, that is, the Faster-RCNN has a convolutional neural network 30 that generates a convolutional feature map M0 from the input image S0, a first discriminator 40 that specifies an object candidate region P0 included in the convolutional feature map M0, and a second discriminator 50 that specifies a category of an object candidate included in the object candidate region P0 on the basis of the object candidate region P0. The convolutional neural network 30 corresponds to a convolution unit of the present disclosure.

Here, in the present embodiment, the first discriminator 40 specifies a candidate region of lung cancer in the input image S0 as an object candidate region P0, and the second discriminator 50 classifies the candidate region of the lung cancer into each symptom category of a malignant lesion or a benign lesion, or a non-lesion region. Here, examples of the candidate region of the lung cancer include a lung nodule region. Lung nodules include lung nodules having different properties, such as ground-glass lung nodules and solid lung nodules. Therefore, lung nodules include ground-glass lung nodules and solid lung nodules. As described above, in the present embodiment, the object to be specified in the input image S0 includes a plurality of subclass objects having different properties.

Here, the ground-glass lung nodule has pale white color, and the boundary thereof is not so clear. On the other hand, the solid lung nodule has white color, and the boundary thereof is clear. For this reason, the ground-glass lung nodule and the solid lung nodule have different shapes and signal values from each other, and thus have different properties.

The convolutional neural network 30 has a plurality of layers such as a convolutional layer, a pooling layer, and a deconvolutional layer. In a case where the input image S0 is received as an input, the convolutional neural network 30 outputs the convolutional feature map M0 to which the features of the input image S0 are mapped. The convolutional neural network 30 in the present embodiment has a convolutional layer and a pooling layer. In this case, the convolutional feature map M0 is smaller in size than the input image S0. For example, in a case where the convolutional neural network 30 has one or two pooling layers, the size of the convolutional feature map M0 is ¼ or ¹⁄₁₆ with respect to the input image S0, respectively. Alternatively, in a case where the convolutional neural network 30 has no pooling layer or has a deconvolutional layer, the size of the convolutional feature map M0 is the same as that of the input image S0. Here, as the convolutional neural network, a known model such as the Zeiler and Fergus model or the Simonyan and Zisserman model, which are described in the above-mentioned literature by Shaoqing, et al. can be used.

Figure 4:
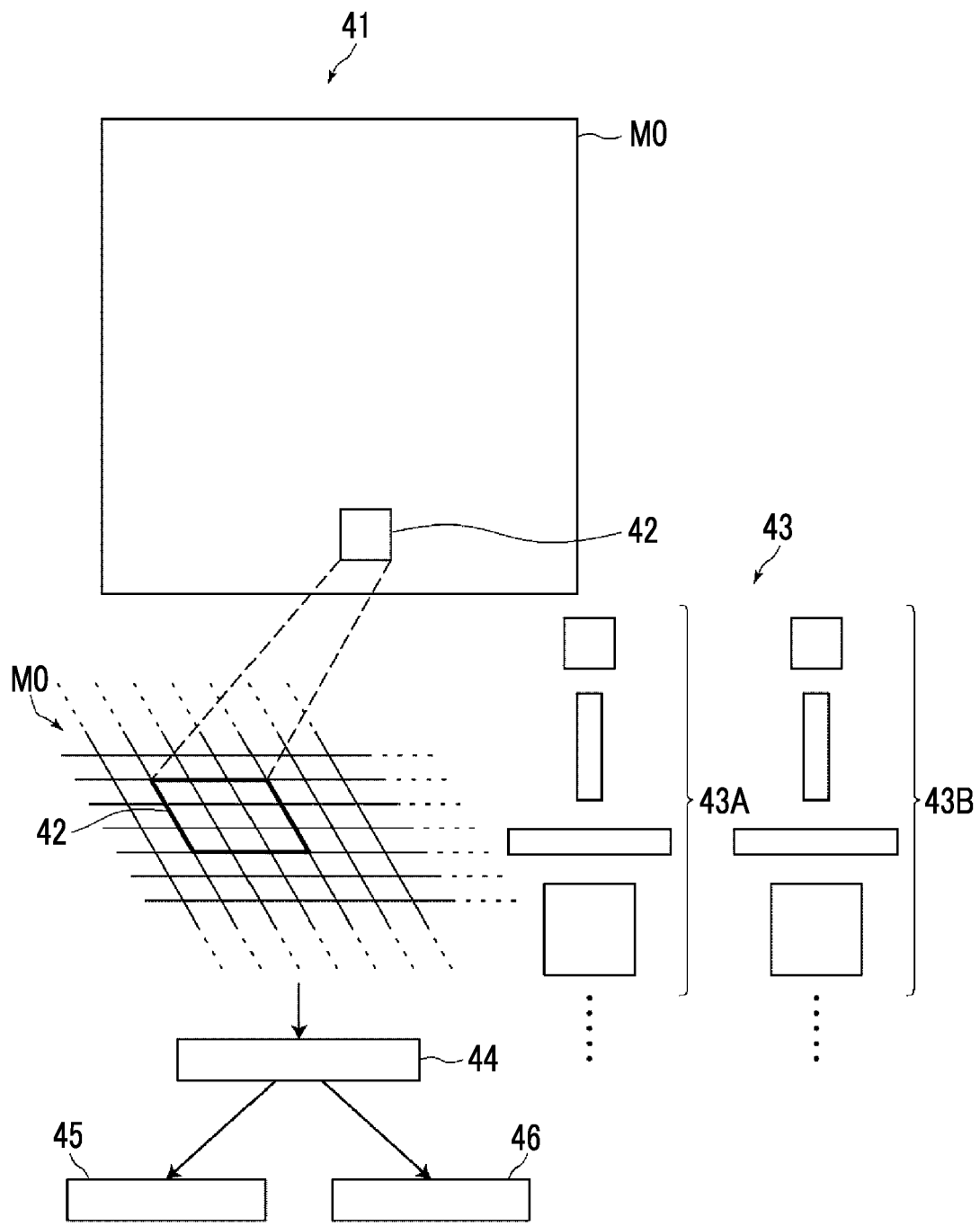
FIG. 4 is a diagram showing a configuration of an RPN.

The first discriminator 40 has a translation-invariant region proposal network (an object region proposal network, hereinafter, referred to as an RPN 41). The RPN 41 corresponds to a component of the present disclosure. The RPN 41 specifies an object candidate region included in the convolutional feature map M0 which is received from the convolutional neural network 30 as an input. FIG. 4 is a diagram showing the configuration of the RPN. As shown in FIG. 4, the RPN 41 performs convolution on the convolutional feature map M0 through a sliding window 42. The sliding window 42 extracts signal values in a region of n×n (for example, 3×3) pixels centered on each pixel on the convolutional feature map M0. Then, the RPN 41 extracts the signal values in the region of n×n pixels in the convolutional feature map M0 while sequentially moving the sliding window 42 in a predetermined pixel unit on the convolutional feature map M0. In the present embodiment, the center pixel position of the sliding window 42 in the convolutional feature map M0 is a target pixel position for detecting an object candidate.

Here, in the RPN 41, a plurality of anchors 43 which are set at the center position of the sliding window 42 set on the convolutional feature map M0, that is, the target pixel position in the convolutional feature map M0 are defined in advance. The anchors 43 are rectangular regions having various sizes and various aspect ratios. In the present embodiment, the anchors 43 are defined according to the properties of the subclass objects included in the object to be specified. Specifically, a plurality of anchors 43A for ground-glass lung nodules and a plurality of anchors 43B for solid lung nodules are defined.

In the present embodiment, it is assumed that nine types of anchors 43A for ground-glass lung nodules are defined in total. The nine types of anchors 43A have three height-to-width aspect ratios of 1:1, 2:1, and 1:2, and three sizes of 128 pixels, 256 pixels, and 512 pixels as areas. Further, it is assumed that nine types of anchors 43B for solid lung nodules are defined in total. The nine types of anchors 43B have three height-to-width aspect ratios of 1:1, 2:1, and 1:2, and three sizes of 128 pixels, 256 pixels, and 512 pixels as areas. The aspect ratios and the areas of the anchors 43A and 43B are not limited to these values. Further, for each of the anchors 43A and 43B, the number of anchor 43 may be defined to be less than nine types, or more than nine types. Further, the numbers of anchors included in the anchors 43A and 43B may not be the same. The number of pixels of the anchor is the number of pixels with respect to the input image S0, and the size of the anchor is also changed depending on the size of the convolutional feature map M0. In the present embodiment, the size of the convolutional feature map M0 with respect to the input image S0 and the sizes of the anchors 43A and 43B are examples for explanation, and in practice, various values other than the above-described values can be taken.

Further, the RPN 41 comprises an intermediate layer 44, a classification layer 45, and a regression layer 46. The intermediate layer 44 performs convolution on the signal values of n×n pixels in the sliding window 42 to derive a representative value of the signal values. The representative value of the signal values can be, for example, an average value, a maximum value, an intermediate value, or the like, but is not limited thereto.

Figure 5:
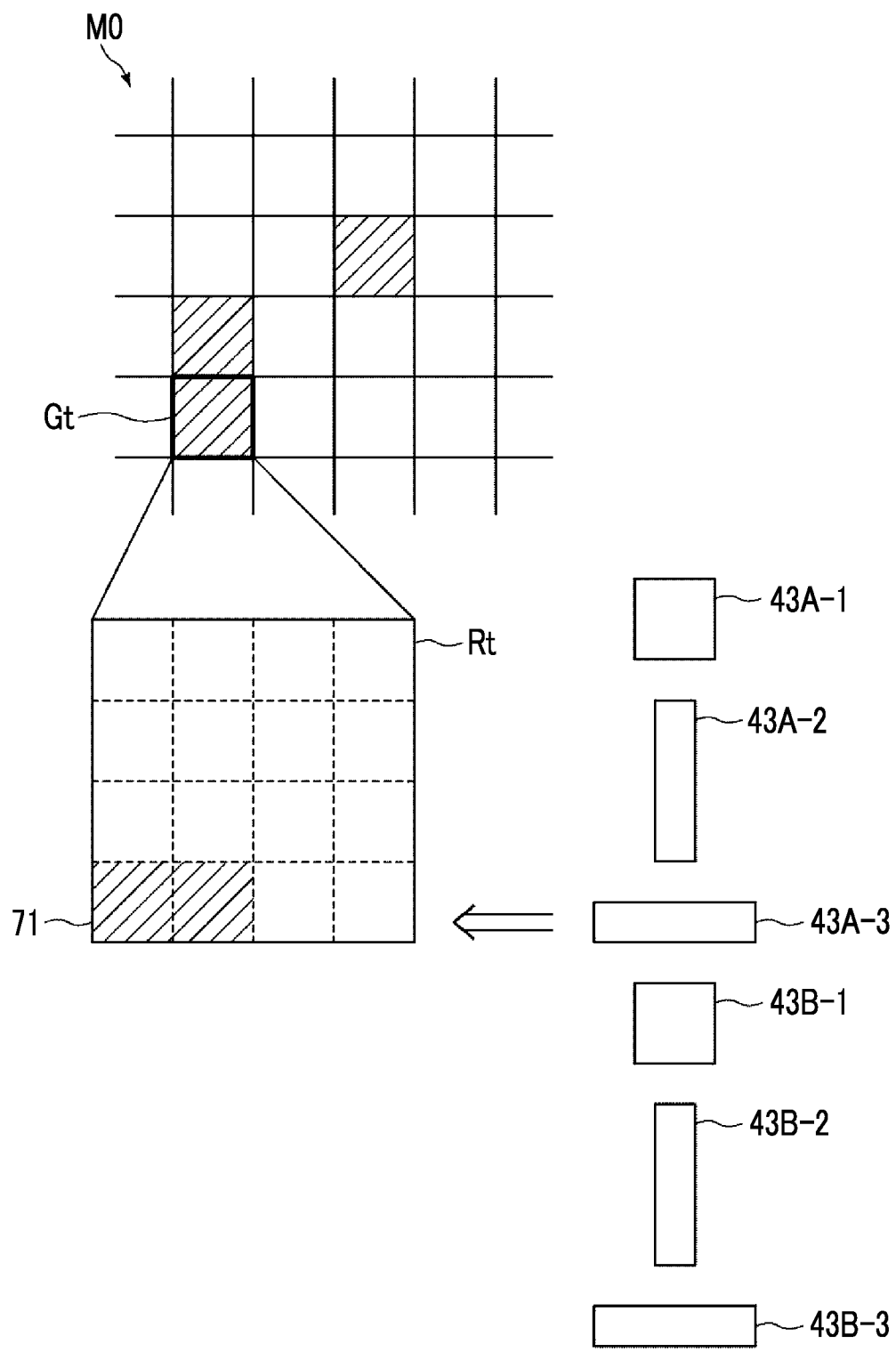
FIG. 5 is a diagram for explaining selecting an anchor.

The classification layer 45 determines the presence or absence of an object candidate for the target pixel position of the convolutional feature map M0, and determines the presence or absence of the object candidate in the corresponding pixel position on the input image S0 corresponding to the target pixel position, on the basis of the representative value of the sliding window 42 derived by the intermediate layer 44. FIG. 5 is a diagram schematically showing processing performed by the classification layer 45. In the convolutional feature map M0, there is a difference in signal values between the object candidate and the background in which the object candidate is not present. Therefore, the classification layer 45 compares the representative value derived at the target pixel position with a predetermined threshold value, and determines whether the target pixel position is in the object candidate region or the background region. Here, in FIG. 5, the object candidates are present at the pixel positions where diagonal lines are given in the convolutional feature map M0.

In a case where determination is made that the target pixel position is in the object candidate region, the classification layer 45 sets an anchor 43 with respect to the target pixel position in the convolutional feature map M0. For setting the anchor 43, the classification layer 45 refers to the corresponding pixel position of the input image S0 which corresponds to the target pixel position in the convolutional feature map M0 determined to be in the object candidate region and the pixel value of the corresponding pixel position. For example, with regard to the target pixel position Gt shown in FIG. 5, the classification layer 45 refers to the plurality of corresponding pixel positions corresponding to the target pixel position Gt in the input image S0 and the pixel values of the corresponding pixel positions. The classification layer 45 may refer to the representative value of the pixel values of the plurality of corresponding pixel positions. Here, in the present embodiment, assuming that the convolutional feature map M0 has a size of ¹⁄₁₆ of the input image S0, the corresponding pixel positions corresponding to the target pixel position Gt in the input image S0 consist of 4×4=16 pixels. A region of the input image S0 consisting of the plurality of corresponding pixel positions is referred to as a corresponding pixel region Rt.

The classification layer 45 determines the presence or absence of the object candidate for each corresponding pixel position in the corresponding pixel region Rt of the input image S0. In the corresponding pixel region Rt, there is a difference in signal values between the object candidate and the background in which the object candidate is not present. Therefore, the classification layer 45 compares the signal value of each corresponding pixel position in the corresponding pixel region Rt with a predetermined threshold value, and determines whether each corresponding pixel position in the corresponding pixel region Rt is in the object candidate region or the background region. Here, in FIG. 5, the object candidate is present at the corresponding pixel positions where diagonal lines are given in the corresponding pixel region Rt. A region consisting of pixels including the object candidate in the corresponding pixel region Rt is a ground truth box 71.

Subsequently, the classification layer 45 selects an anchor. Specifically, the classification layer 45 selects an anchor on the basis of the signal values in the ground truth box including the object candidate and the similarity in shape and size to the ground truth box from among the plurality of anchors 43. Instead of the signal values in the ground truth box, the signal value of the target pixel position in the convolutional feature map M0 or the representative value of the signal values may be used. Here, as shown in FIG. 5, the pixel positions in which the object candidate is present in the corresponding pixel region Rt, that is, the ground truth box 71 consists of two pixels which are arranged horizontally and in which diagonal lines are given. Further, it is assumed that the signal value of the ground truth box 71 represents the property of the ground-glass lung nodule. In this case, the classification layer 45 selects the anchor 43A for a ground-glass lung nodule from two types of anchors 43A and 43B. Further, the classification layer 45 selects an anchor which is the most similar in size and aspect ratio to the ground truth box 71 from among the plurality of anchors 43A (43A-1, 43A-2, . . . ) for ground-glass lung nodules. For example, as shown in FIG. 5, in the RPN 41, three types of anchors 43A-1, 43A-2, and 43A-3 having height-to-width aspect ratios of 1:1, 2:1, and 1:2, respectively, are defined for ground-glass lung nodules, and three types of anchors 43B-1, 43B-2, and 43B-3 having height-to-width aspect ratios of 1:1, 2:1, and 1:2, respectively, are defined for solid lung nodules. In this case, the anchor 43A for a ground-glass lung nodule is selected, and the anchor 43A-3 having an aspect ratio of 1:2 which is the most similar in size and aspect ratio to the ground truth box 71 is further selected. In FIG. 5, for ease of explanation, the sizes of the anchors 43A-1, 43A-2, and 43A-3 are 1×1 pixel, 2×0.5 pixels, and 0.5×2 pixels in height and width, respectively, and the sizes of the anchors 43B-1, 43B-2, and 43B-3 are 1×1 pixel, 2×0.5 pixels, and 0.5×2 pixels in height and width, respectively.

In this case, the classification layer 45 generates an object candidate channel in which the value of the corresponding pixel position is 1 and the value of the other pixel position is 0, and a background channel in which the value of the corresponding pixel position is 0 and the value of the other pixel position is 1, in the convolutional feature map M0, as a specification result of the region of the object candidate.

Figure 6:
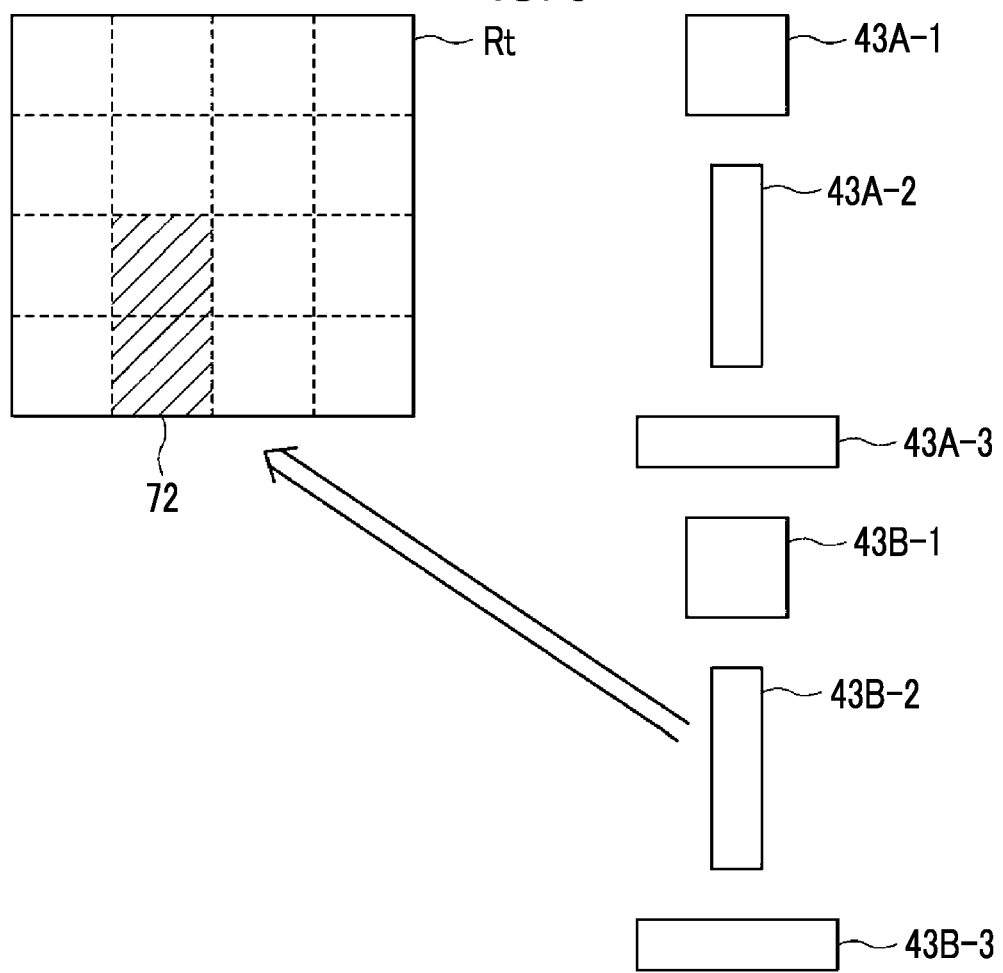
FIG. 6 is a diagram for explaining selecting another anchor.

Meanwhile, as shown in FIG. 6, it is assumed that the pixel positions in which the object candidate is present in the corresponding pixel region Rt, that is, the ground truth box 72 consists of two pixels arranged vertically, and the signal value thereof represents the property of the solid nodule. In this case, in a case where the same anchors 43A and 43B as the anchors shown in FIG. 5 are defined in the RPN 41, the anchor 43B for a solid lung nodule is selected, and the anchor 43B-2 having an aspect ratio of 2:1 is further selected from among the anchors 43B-1, 43B-2, and 43B-3. Also in FIG. 6, for ease of explanation, the anchors included in each of the anchors 43A and 43B have sizes of 1×1 pixel, 2×0.5 pixels, and 0.5×2 pixels in height and width.

Figure 7:
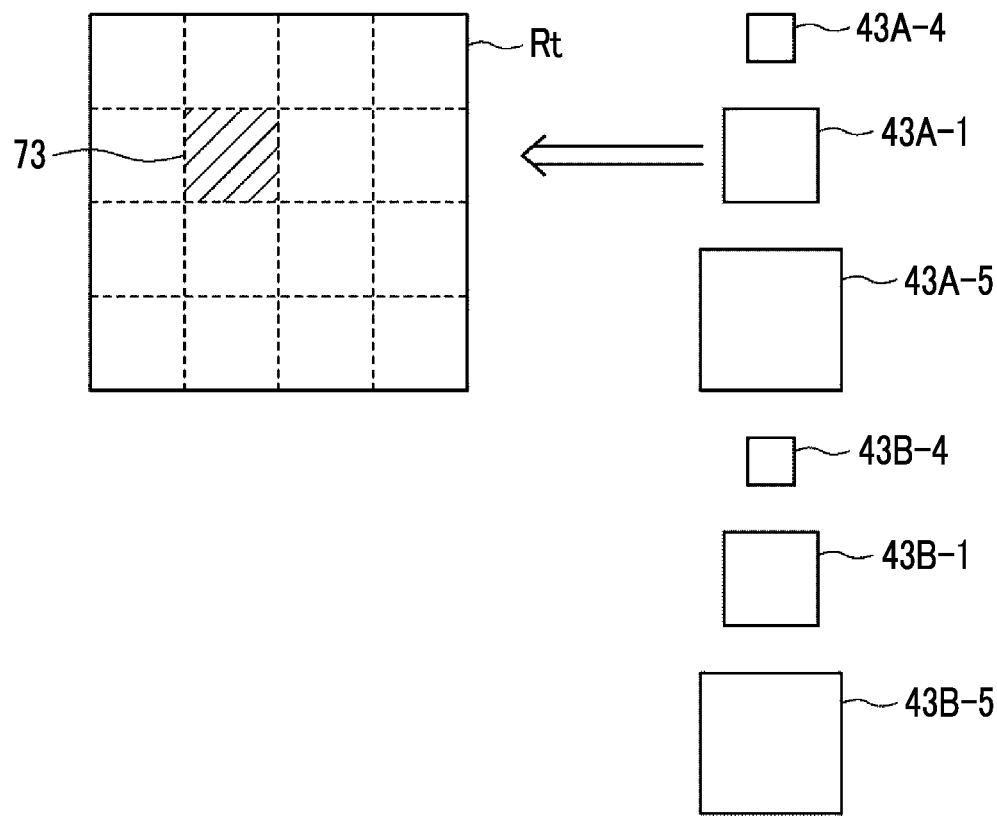
FIG. 7 is a diagram for explaining selecting still another anchor.

Alternatively, as shown in FIG. 7, it is assumed that the pixel position in which the object candidate is present in the corresponding pixel region Rt, that is, the ground truth box 73 consists of one pixel, and the signal value thereof represents the property of the ground-glass nodule. In this case, as shown in FIG. 7, three types of anchors 43A-4, 43A-1, and 43A-5 having different sizes and each having an aspect ratio of 1:1 are defined for ground-glass lung nodules, and three types of anchors 43B-4, 43B-1, and 43B-5 having different sizes and each having an aspect ratio of 1:1 are defined for solid lung nodules. In this case, the anchor 43A for a ground-glass lung nodule is selected, and the anchor 43A-1 having an intermediate size is further selected from among the anchors 43A-4, 43A-1, and 43A-5. Also in FIG.

7, for ease of explanation, the anchors included in each of the anchors 43A and 43B have sizes of 0.5×0.5 pixels, 1×1 pixel, and 1.5×1.5 pixels.

The regression layer 46 predicts at least one of movement or transformation of the selected anchor to specify an object candidate region surrounding the object candidate in the input image S0. That is, in a case where the object candidate is included in the target pixel position in the convolutional feature map M0, the regression layer 46 calculates a difference between the anchor 43 selected by the classification layer 45 and the ground truth box which is a region in which the object candidate is present, and specifies the object candidate region in the input image S0. Here, the difference means the movement amount and the transformation amount of the selected anchor 43 for making the selected anchor 43 match with the ground truth box. The movement amount is a movement amount on the coordinates of the input image S0, and the movement amount indicates respective movement amounts in the XY directions in a case where the input image S0 is two-dimensional, and respective movement amounts in the XYZ directions in a case where the input image S0 is three-dimensional. The transformation amount indicates respective enlargement ratios in the XY directions in a case where the input image S0 is two-dimensional, and respective enlargement ratios in the XYZ directions in a case where the input image S0 is three-dimensional. Since the transformation is synonymous with enlargement or reduction in size of the anchor, the transformation amount is synonymous with the enlargement ratio.

Figure 8:
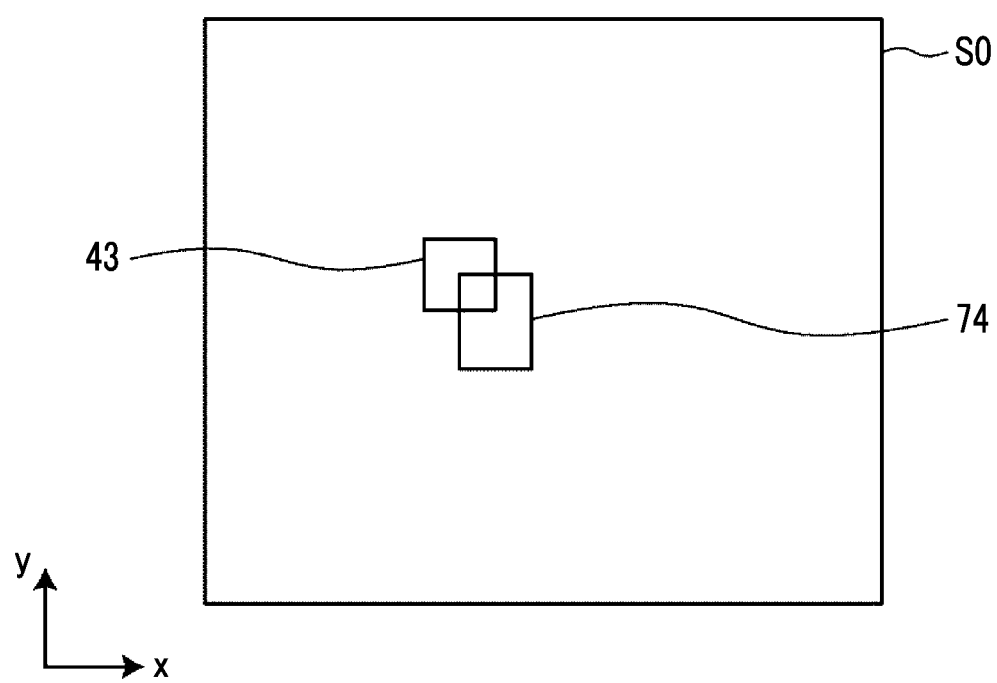
FIG. 8 is a diagram for explaining a difference between the anchor and a ground truth box.

FIG. 8 is a diagram for explaining the difference between the anchor and a ground truth box. As shown in FIG. 8, it is assumed that the input image S0 includes the ground truth box 74, and the anchor 43 is set at the position shown in FIG. 8. The regression layer 46 derives the movement amount $\Delta x$ in the x direction, the movement amount $\Delta y$ in the y direction, the enlargement ratio $\Delta w$ in the x direction, and the enlargement ratio $\Delta h$ in the y direction for making the anchor 43 match with the ground truth box 74. When the anchor 43 is transformed by the derived movement amount and enlargement ratio, a region matching with the ground truth box 74 is specified.

The regression layer 46 specifies the object candidate region P0 in the input image S0 on the basis of the derived difference. That is, the regression layer 46 specifies the object candidate included in the input image S0, that is, a region matching with the ground truth box, as the object candidate region P0.

Here, the first discriminator 40 is translation-invariant. The translation-invariance means that the determination criteria for specifying the object candidate region do not change regardless of the position on the image to be received as an input (here, the convolutional feature map M0). For example, it means that the methods of selecting, moving, and transforming the anchor are the same regardless of the size and position of the object included in the image to be received as an input.

In the present embodiment, the learning of the first discriminator 40, that is, the RPN 41 is performed by a learning unit 23 as follows. That is, a training convolutional feature map is generated for various training input images in which the properties of an object, sizes, aspect ratios are known, and a training rectangular region circumscribing an object to be discriminated is cut out from the training convolutional feature map. Then, an anchor which is the most similar in property of the object, size, and aspect ratio to the object included in the training rectangular region of the input image (referred to as an input training rectangular region) which corresponds to the pixel position including the center coordinates of the rectangular region, is selected from among the plurality of anchors 43.

Figure 9:
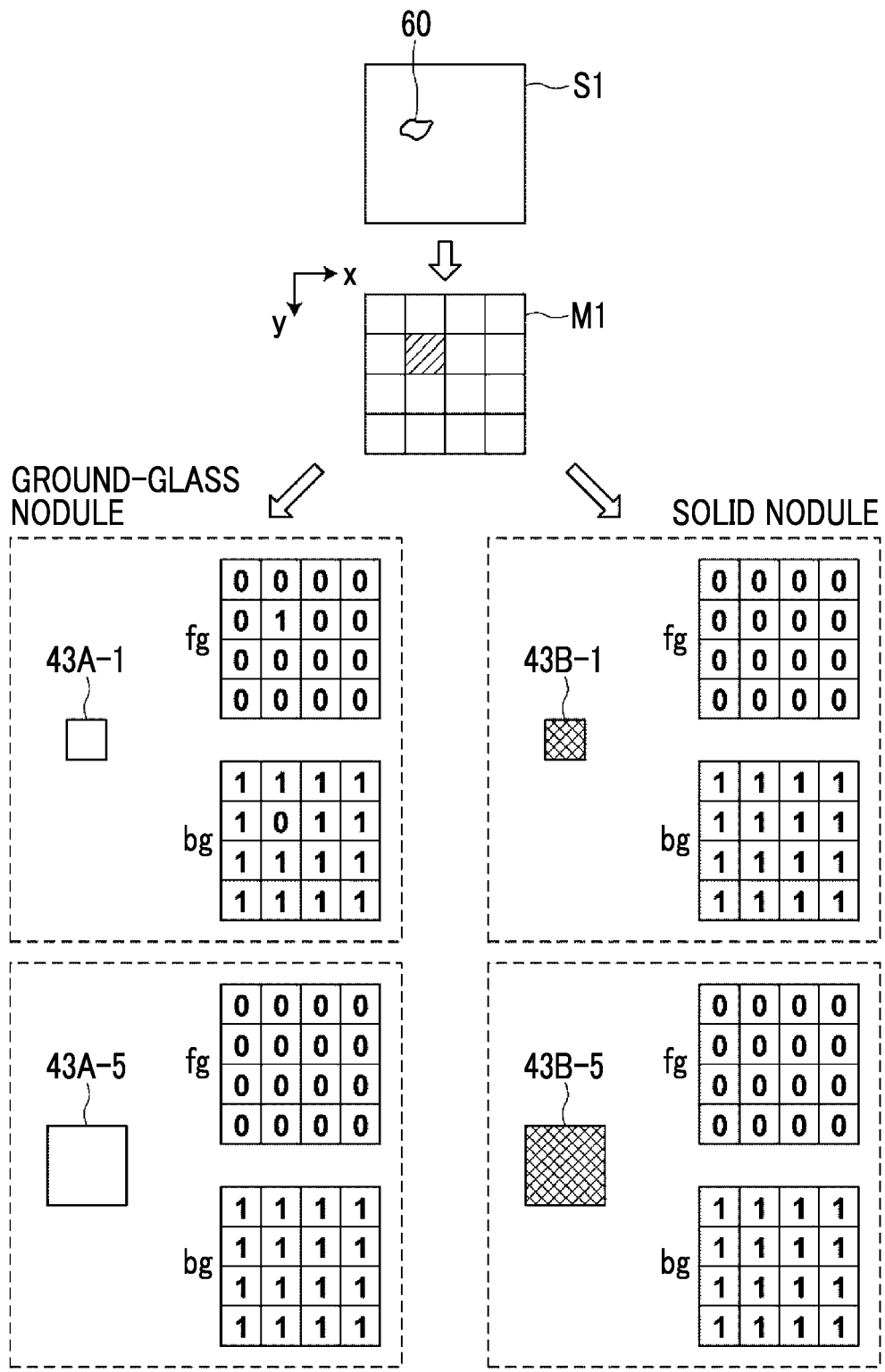
FIG. 9 is a diagram for explaining learning of a first discriminator.

FIG. 9 is a diagram for explaining learning of the first discriminator. As shown in FIG. 9, it is assumed that the training input image S1 includes a lesion 60 of a ground-glass lung nodule. In the training convolutional feature map M1 generated from the training input image S1, the signal value of the pixel position (2, 2) corresponding to the lesion 60 included in the training input image S1 represents the property of the ground-glass lung nodule. The origin of the pixel position is the upper left corner of the training convolutional feature map M1. Further, it is assumed that the anchors 43A-1 and 43A-5 for ground-glass lung nodules and the anchors 43B-1 and 43B-5 for solid lung nodules are defined in the RPN 41.

In a case where the classification layer 45 in the first discriminator 40 specifies the object candidate region included in the input image S0, the classification layer 45 determines whether the target pixel position in the convolutional feature map M0 is in the object candidate region or the background region. In this case, the classification layer 45 generates an object candidate region channel and a background region channel from the convolutional feature map M0. Here, in the object candidate region channel, the value of the pixel position of the object candidate region is 1, and the value of the pixel position of the other region is 0. Further, in the background region channel, the value of the pixel position of the background region is 1, and the value of the pixel position of the other region is 0.

The learning unit 23 performs learning of the classification layer 45 such that the classification layer 45 specifies the pixel position corresponding to the lesion 60 in the training convolutional feature map M1 as the object candidate region, and specifies the other pixel position as the background, in a case where the anchor 43A-1 which is similar in size and shape to the lesion included in the training input image S1 between the anchors 43A-1 and 43A-5 for ground-glass lung nodules is applied to the training convolutional feature map M1. That is, since the signal value of the pixel position (2, 2) of the training convolutional feature map M1 shown in FIG. 9 represents the property of the ground-glass lung nodule, the learning unit 23 performs learning of the classification layer 45 such that the classification layer 45 first applies the anchor 43A for a ground-glass lung nodule to the pixel position (2, 2). Further, the ground-glass lung nodule of the training input image S1 corresponding to the target pixel position is similar in size and shape to the anchor 43A-1. Therefore, the learning unit 23 performs learning of the classification layer 45 such that the classification layer 45 selects the anchor 43A-1 for a ground-glass lung nodule for training input image S1 shown in FIG. 9, the value of the pixel position (2, 2) is 1 and the value of the other pixel position is 0 in the object candidate region channel fg, and the value of the pixel position (2, 2) is 0 and the value of the other pixel position is 1 in the background region channel bg. In this case, the learning unit performs learning of the classification layer 45 such that the values of all the pixel positions of the object candidate region channel fg are 0, and the values of all the pixel positions of the background region channel bg are 1, in a case where the anchors 43A-5, 43B-1 and 43B-5 are applied.

As a result, the learning of the classification layer 45 is performed such that the anchor 43A is applied to the ground-glass lung nodule and the anchor 43B is applied to the solid lung nodule.

Figure 10:
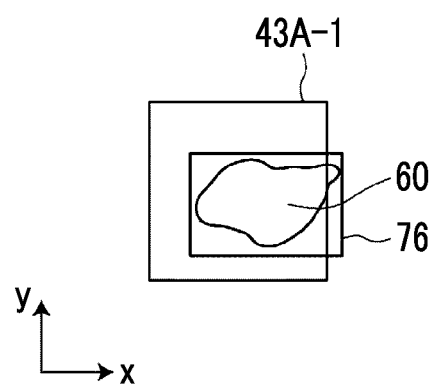
FIG. 10 is a partially enlarged view of a training input image for explaining calculation of the difference.

Next, the learning unit 23 calculates the difference between the set anchor 43A-1 and the ground truth box surrounding the lesion 60 in the training input image S1. FIG. 10 is a partially enlarged view of the training input image S1 for explaining the calculation of the difference. Here, the difference means the movement amount and the transformation amount of the anchor 43A-1 for making the anchor selected as described above match with the ground truth box 76. For example, in a case where the input image is two-dimensional, the movement amount is the movement amount Δx in the x direction and the movement amount Δy in the y direction, and the transformation amount is the enlargement ratio Δw in the x direction and the enlargement ratio Δh in the y direction, for making the center of the anchor 43A-1 match with the center of the ground truth box 76.

The learning unit 23 performs learning of the regression layer 46 such that the difference between the anchor 43A-1 and the ground truth box 76 is the calculated difference. In this case, the learning of the regression layer 46 may be performed by using the stochastic gradient descent method or the backpropagation method.

The second discriminator 50 specifies the category of the object candidate on the basis of the convolutional feature map M0 and the object candidate region P0 specified by the first discriminator 40. The second discriminator 50 is the same as those described in the above-mentioned literature by Shaoqing et al. and U.S. Pat. No. 9,858,496B. For example, the second discriminator 50 consists of a neural network having a pooling layer and one or more fully connected layers, and specifies the category of the object candidate as follows. First, the second discriminator 50 cuts out the object candidate region P0 specified by the first discriminator 40 from the convolutional feature map M0, and resizes the cut-out object candidate region P0 to a predetermined size, as necessary. Then, the second discriminator 50 specifies the symptom category for the cut-out object candidate region P0.

Specifically, the second discriminator 50 outputs each score indicating the probability of being a specific symptom for the cut-out object candidate region P0, and specifies the symptom category for the object candidate region P0 to a symptom having the highest score. For example, in the present embodiment, since the candidate region of the lung nodule is specified by the first discriminator 40, each score indicating the probability of being a malignant lesion or a benign lesion is output for the candidate region of the lung nodule, and the characteristics of the lung nodule region are specified to the symptom having the higher score. On the other hand, in a case where both the score of the malignant lesion and the score of the benign lesion are not a threshold value or more, the second discriminator 50 specifies the category of the object candidate region P0 to a non-lesion region.

The learning of the second discriminator 50 is performed such that an image including a known lung nodule of which the symptom category is either the malignant lesion or the benign lesion is set as a training image, and in a case where the training image is received as an input, the score of the symptom category of the lung nodule included in the received training image is 100%. In this case, as in the first discriminator 40, the learning of the second discriminator 50 may be performed by using the stochastic gradient descent method or the backpropagation method.

The second discriminator 50 may also specify the position and size of the rectangle circumscribing the object. In this case, processing of correcting the position and size of the object candidate region P0 in the convolutional feature map M0 is performed such that the cut-out object candidate region P0 circumscribes the object more accurately.

Further, the second discriminator 50 may discriminate the contour of the object included in the object candidate region P0. In this case, the learning of the second discriminator 50 is performed such that the second discriminator 50 discriminates the contour of the object included in the object candidate region P0 specified by the first discriminator 40.

Figure 11:
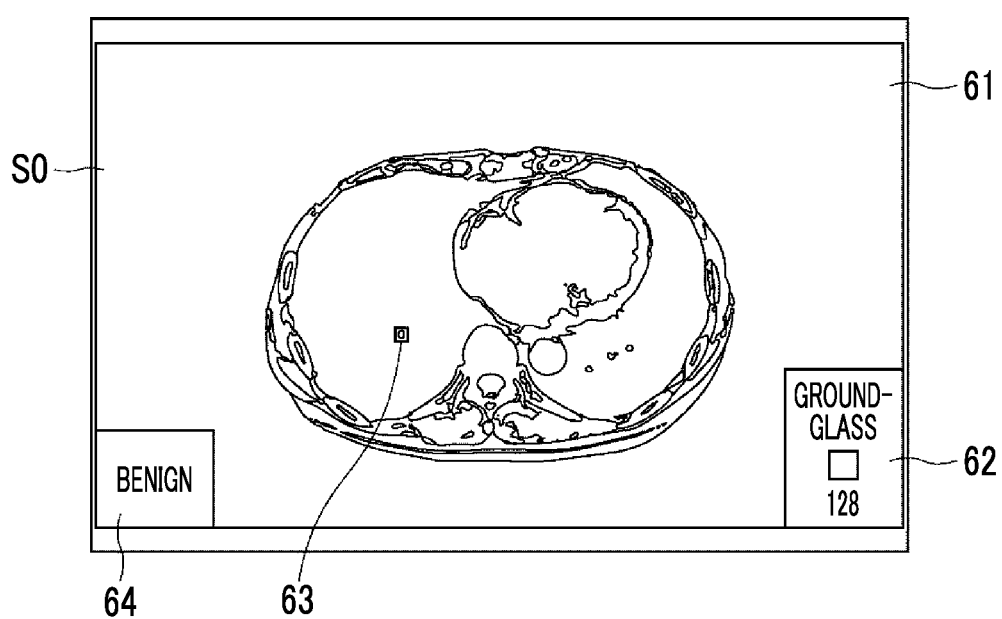
FIG. 11 is a diagram showing a result screen.

The display controller 24 displays the property regarding the anchor selected by the first discriminator 40 and the object candidate region specified by the first discriminator 40 on the display unit 14. Further, the size and the shape of the anchor selected by the first discriminator 40 are displayed on the display unit 14. In addition, the specification result of the category by the second discriminator 50 is displayed on the display unit 14. FIG. 11 is a diagram showing a result screen on the display unit 14. As shown in FIG. 11, the input image S0 is displayed on the result screen 61. Further, the lower right corner of the result screen 61 includes an anchor display region 62 for displaying the property, type, and size of the anchor used. In FIG. 11, information indicating that an anchor for a ground-glass lung nodule having an aspect ratio of 1:1 and an area of 128 pixels is selected is displayed in the anchor display region 62. Further, a rectangle 63 surrounding the object candidate specified in the input image S0 is displayed on the result screen 61. In addition, the lower left corner of the result screen 61 includes a category display region 64 for displaying the symptom category of the rectangle 63. In FIG. 11, "benign" is displayed as the symptom category of the specified object in the category display region 64.

Figure 12:
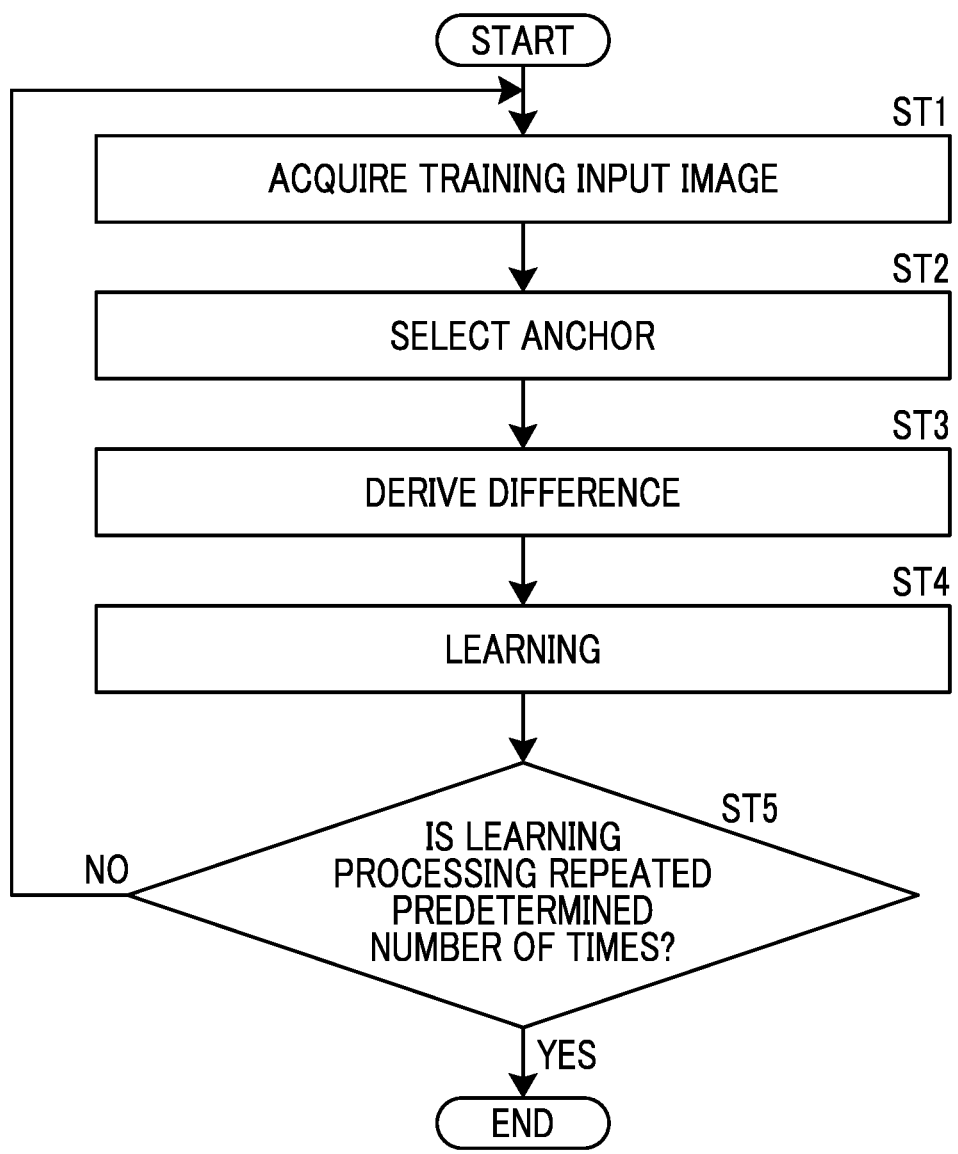
FIG. 12 is a flowchart showing learning processing according to the present embodiment.

Next, processing performed in the present embodiment will be described. FIG. 12 is a flowchart showing learning processing according to the present embodiment. First, the learning unit 23 acquires a training input image S1 (Step ST1). Then, the learning unit 23 selects an anchor according to the property of the object included in the training input image S1, for the training input image S1 (Step ST2). Further, the learning unit 23 derives the difference between the anchor and the lesion included in the training input image S1, that is, the ground truth box (Step ST3). Then, the learning unit 23 performs learning of the RPN 41 of the first discriminator 40 such that in a case where the training input image S1 is received as an input, the RPN 41 applies the selected anchor, predicts at least one of movement or transformation of the applied anchor, and surrounds the ground truth box included in the training input image S1 as the object candidate (Step ST4). When the learning processing is repeated a predetermined number of times (Step ST5: YES), the learning processing ends.

The number of times of learning is not limited to the predetermined number of times. The learning may be performed until the accuracy rate exceeds a predetermined threshold value (for example, 99%) after the object candidate region is specified by using the first discriminator of which the learning has been performed.

FIG. 13 is a flowchart showing region specification processing according to the present embodiment. First, the image acquisition unit 21 acquires an input image S0 (Step ST11). Next, the convolutional neural network 30 of the object specification unit 22 generates a convolutional feature map M0 from the input image S0 (Step ST12). Then, the first discriminator 40 selects an anchor 43 (Step ST13), and specifies an object candidate region P0 in the input image S0 on the basis of the selected anchor 43 (Step ST14). Then, the second discriminator 50 specifies the symptom category in the object candidate region P0 (Step ST15). Further, the display controller 24 displays the result screen 61 including the selected anchor and the category of the specified object on the display unit 14 (Step ST16), and the processing ends.

Here, in the methods described in the above-mentioned literature by Shaoqing et al. and U.S. Pat. No. 9,858,496B, even in a case where the object included in the input image S0 includes the plurality of subclass objects having different properties, it is necessary to perform learning such that the anchor in RPN can detect the subclass objects of all properties. For this reason, the configuration of RPN becomes complicated, so that the learning burden becomes heavy. Further, the processing burden is also heavy in a case of detecting the object. Therefore, the methods described in the above-mentioned literature by Shaoqing et al. and U.S. Pat. No. 9,858,496B cannot efficiently perform learning and efficiently detect an object.

According to the present embodiment, in a case of specifying the object candidate region which is included in the input image S0 and which includes the plurality of subclass objects having different properties, for example, the candidate region of the lung nodule including the ground-glass lung nodule or the solid lung nodule, an anchor according to the property of the subclass object is selected. For this reason, the learning of the first discriminator 40 is performed such that the first discriminator 40 specifies the subclass object as the object candidate region by using the anchor according to the property, so that the configuration of the first discriminator 40 can be simplified. Therefore, according to the present embodiment, the learning of the first discriminator 40 can be efficiently performed. Further, the object candidate region P0 in the input image S0 can be efficiently specified.

Further, in the methods described in the above-mentioned literature by Shaoqing et al. and U.S. Pat. No. 9,858,496B, the anchor is selected on the basis of the size of the overlap between the anchor and the ground truth box. For example, in a case of the ground truth box 73 as shown in FIG. 7, the largest square anchor 43A-5 shown in FIG. 7 is selected on the basis of the size of the overlap between the ground truth box and the anchor in a case where the anchor is positioned at the center of the corresponding pixel region Rt. On the other hand, in the present embodiment, the anchor is selected on the basis of the similarity in shape and size to the ground truth box. Therefore, as described above, the anchor 43A-1 is selected in the present embodiment.

As described above, in the present embodiment, the object candidate region P0 is specified on the basis of the anchor. Therefore, in a case of the ground truth box 73 as shown in FIG. 7, the anchor 43A-1 rather than the anchor 43A-5 can reduce the operation amount for at least one of movement or transformation of the anchor for making the anchor match with the ground truth box 73. Therefore, according to the present embodiment, the object included in the input image S0 can be specified quickly and efficiently.

In the above embodiment, the anchor is selected on the basis of the similarity in shape and size to the ground truth box, in addition to the property, but the present disclosure is not limited thereto. For example, as described in U.S. Pat. No. 9,858,496B, the anchor may be selected on the basis of the size of the overlap between the anchor and the ground truth box, in addition to the property. For example, in a case of the ground truth box 73 having the signal value representing the property of the ground-glass nodule as shown in FIG. 7, the largest square anchor 43A-5 shown in FIG. 7 is selected on the basis of the size of the overlap between the ground truth box and the anchor in a case where the anchor is positioned at the center of the corresponding pixel region Rt. In this case, the specification of the object candidate region using the selected anchor is performed in the same manner as in the above embodiment. Further, the learning of the first discriminator 40 by the learning unit 23 is performed such that the first discriminator 40 selects an anchor having the highest overlap with the ground truth box.

Further, in the above embodiment, the plurality of anchors are defined for each of the anchor for the ground-glass lung nodule and the anchor for the solid lung nodule, but the present disclosure is not limited thereto. Only one anchor for each of the subclass objects, that is, only one anchor for each of the ground-glass lung nodule and the solid lung nodule may be defined.

In the above-described embodiment, the first discriminator 40 and the second discriminator 50 consist of neural networks, but the present disclosure is not limited thereto. For example, a support vector machine (SVM) and a decision tree may be provided.

Further, in the above-described embodiment, the object specification unit 22 comprises the convolutional neural network 30, and the convolutional neural network 30 generates the convolutional feature map M0 and in the generated convolutional feature map M0, the object candidate region P0 is specified, but the present disclosure is not limited thereto. The object specification unit 22 may do not comprise the convolutional neural network 30, and the first discriminator 40 may specify the object candidate region P0 in the input image S0. In this case, the second discriminator 50 may specify the category of the object on the basis of the convolutional feature map M0, but may specify the category of the object by cutting out the object candidate region P0 from the input image S0.

Further, in the above-described embodiment, the convolutional neural network 30 has a convolutional layer and a pooling layer, but the present disclosure is not limited thereto. The convolutional neural network 30 may have no pooling layer or further have a deconvolutional layer. In a case where the convolutional neural network 30 has no pooling layer or has a deconvolutional layer, the size of the convolutional feature map M0 is the same as that of the input image S0.

Further, in the above embodiment, the second discriminator 50 receives the convolutional feature map M0 as an input, and specifies the category of the object on the basis of the convolutional feature map M0, but the present disclosure is not limited thereto. The second discriminator 50 may receive the input image S0 as an input, and specify the category of the object on the basis of the input image S0.

Further, in the above embodiment, as the object that includes the plurality of subclass objects having different properties, lung nodules including ground-glass lung nodules and solid lung nodules as the subclass objects are used, but the present disclosure is not limited thereto. For example, in a case where the Faster-RCNN that specifies a person included in an image is built, Caucasian, Negroid, and Mongoloid are included as the subclass objects having different properties, that is, different skin color (signal values in the image) in a case where the person is set as the object to be specified. In such a case, anchors according to race are prepared and the learning of the RPN 41 is performed, so that the Faster-RCNN can also be built such that the anchor according to the race is selected and a person candidate region is specified.

Alternatively, in a case where the Faster-RCNN that specifies a dangerous object which appears in front of an automobile during driving is built in the autonomous driving technology, the dangerous objects, such as a person, a car, and a bicycle, are included as the subclass objects having different properties, that is, different shapes and structures included. In such a case, anchors according to dangerous objects are prepared and the learning of the RPN 41 is performed, so that the Faster-RCNN can also be built such that the anchor according to the dangerous object is selected and a dangerous object candidate region is specified.

Further, in the above-described embodiment, for example, as a hardware structure of a processing unit that executes various processing such as processing performed by the image acquisition unit 21, the object specification unit 22, the learning unit 23, and the display controller 24, the following various processors may be used. The various processors include, for example, a programmable logic device (PLD), such as a field programmable gate array (FPGA), which is a processor having a changeable circuit configuration after manufacture and a dedicated electrical circuit, such as an application specific integrated circuit (ASIC), which is a processor having a dedicated circuit configuration designed to perform specific processing, in addition to the CPU which is a general-purpose processor that executes software (program) to function as various processing units as described above.

One processing unit may be formed by one of the various processors or may be formed by a combination of two or more processors of the same type or different types (for example, a combination of a plurality of FPGAs and a combination of a CPU and an FPGA). Further, the plurality of processing units may be formed by one processor.

A first example of the configuration in which the plurality of processing units are formed by one processor is an aspect in which one or more CPUs and software are combined to form one processor and the processor functions as a plurality of processing units. A representative example of the aspect is a computer such as a client and server. A second example of the configuration is an aspect in which a processor that implements all of the functions of a system including the plurality of processing units with one integrated circuit (IC) chip is used. A representative example of the aspect is a system on chip (SoC). As described above, as the hardware structure of various processing units, one or more of the various processors are used.

More specifically, an electrical circuit (circuitry) obtained by combining circuit elements, such as semiconductor elements, may be used as the hardware structure of these various processors.

What is claimed is:

1. A region specification apparatus that specifies a region of an object which is included in an input image and which includes a plurality of subclass objects having different properties, the apparatus comprising at least one processor,
wherein the processor functions as a first discriminator that specifies an object candidate included in the input image,
wherein the first discriminator has a component configured to predict at least one of movement or transformation of a plurality of anchors according to the property of the subclass object and specify an object candidate region surrounding the object candidate,
wherein the first discriminator selects an anchor on the basis of a similarity in shape and size to a ground truth box including the object candidate, from among a plurality of anchors having various shapes and various sizes according to the property of the subclass object, predicts at least one of movement or transformation of the selected anchor, and specifies the object candidate region surrounding the object candidate.

2. The region specification apparatus according to claim 1, wherein the processor is configured to display a subclass of the specified object candidate region on a display.

3. The region specification apparatus according to claim 2,
wherein the processor is configured to display the input image in which the object candidate region is specified, on the display.

4. The region specification apparatus according to claim 1, wherein the processor is configured to generate a convolutional feature map from the input image,
wherein the first discriminator specifies the object candidate region on the basis of the convolutional feature map.

5. The region specification apparatus according to claim 4, wherein the processor further functions as a second discriminator that specifies a category of the object candidate on the basis of the convolutional feature map and the object candidate region.

6. The region specification apparatus according to claim 1, wherein the processor is configured to specify a category of the object candidate included in the object candidate region.

7. The region specification apparatus according to claim 6,
wherein the second discriminator corrects the object candidate region.

8. The region specification apparatus according to claim 6,
wherein the second discriminator discriminates a contour of the object candidate in the object candidate region.

9. A learning apparatus that performs learning of a discriminator specifying an object candidate that is a candidate of an object which is included in an input image and which includes a plurality of subclass objects having different properties, the apparatus comprising at least one processor,
wherein the processor is configured to perform processing of applying, to a training image including a subclass object having a known property, an anchor according to the property, predicting at least one of movement or transformation of the applied anchor, and specifying an object candidate region surrounding, as the object candidate, the subclass object, by using a plurality of the training images to perform learning of the discriminator such that the discriminator selects an anchor on the basis of a similarity in shape and size to a ground truth box including the object candidate, from among a plurality of anchors having various shapes and various sizes according to the property of the subclass object, predicts at least one of movement or transformation of the selected anchor according to the property of the subclass object and specifies the object candidate region surrounding the object candidate in the input image.

10. A discriminator that specifies an object candidate that is a candidate of an object which is included in an input image and which includes a plurality of subclass objects having different properties,
wherein the discriminator is configured so that processing of applying, to a training image including a subclass object having a known property, an anchor according to the property, predicting at least one of movement or transformation of the applied anchor, and specifying an object candidate region surrounding, as the object candidate, the subclass object, is performed by using a plurality of the training images to perform learning of the discriminator such that the discriminator selects an anchor on the basis of a similarity in shape and size to a ground truth box including the object candidate, from among a plurality of anchors having various shapes and various sizes according to the property of the subclass object, predicts at least one of movement or transformation of the selected anchor according to the property of the subclass object and specifies the object candidate region surrounding the object candidate in the input image.

11. A region specification method of specifying a region of an object which is included in an input image and which includes a plurality of subclass objects having different properties, the method comprising:

specifying an object candidate included in the input image by a first discriminator that has a component configured to predict at least one of movement or transformation of a plurality of anchors according to the property of the subclass object and specify an object candidate region surrounding the object candidate, wherein the first discriminator selects an anchor on the basis of a similarity in shape and size to a ground truth box including the object candidate, from among a plurality of anchors having various shapes and various sizes according to the property of the subclass object, predicts at least one of movement or transformation of the selected anchor, and specifies the object candidate region surrounding the object candidate.

12. A learning method of performing learning of a discriminator specifying an object candidate that is a candidate of an object which is included in an input image and which includes a plurality of subclass objects having different properties, the method comprising:

performing processing of applying, to a training image including a subclass object having a known property, an anchor according to the property, predicting at least one of movement or transformation of the applied anchor, and specifying an object candidate region surrounding, as the object candidate, the subclass object, by using a plurality of the training images to perform learning of the discriminator such that the discriminator selects an anchor on the basis of a similarity in shape and size to a ground truth box including the object candidate, from among a plurality of anchors having various shapes and various sizes according to the property of the subclass object, predicts at least one of movement or transformation of the selected anchor according to the property of the subclass object and specifies the object candidate region surrounding the object candidate in the input image.

13. A non-transitory computer-readable storage medium that stores a region specification program that causes a computer to execute a region specification method of specifying a region of an object which is included in an input image and which includes a plurality of subclass objects having different properties, the program causing the computer to execute a process, the process comprising:

specifying an object candidate included in the input image by a first discriminator that has a component configured to predict at least one of movement or transformation of a plurality of anchors according to the property of the subclass object and specify an object candidate region surrounding the object candidate, wherein the first discriminator selects an anchor on the basis of a similarity in shape and size to a ground truth box including the object candidate, from among a plurality of anchors having various shapes and various sizes according to the property of the subclass object, predicts at least one of movement or transformation of the selected anchor, and specifies the object candidate region surrounding the object candidate.

14. A non-transitory computer-readable storage medium that stores a learning program that causes a computer to execute a learning method of performing learning of a discriminator specifying an object candidate that is a candidate of an object which is included in an input image and which includes a plurality of subclass objects having different properties, the program causing the computer to execute a process, the process comprising:

performing processing of applying, to a training image including a subclass object having a known property, an anchor according to the property, predicting at least one of movement or transformation of the applied anchor, and specifying an object candidate region surrounding, as the object candidate, the subclass object, by using a plurality of the training images to perform learning of the discriminator such that the discriminator selects an anchor on the basis of a similarity in shape and size to a ground truth box including the object candidate, from among a plurality of anchors having various shapes and various sizes according to the property of the subclass object, predicts at least one of movement or transformation of the selected anchor according to the property of the subclass object and specifies the object candidate region surrounding the object candidate in the input image.

* * * * *